(12) United States Patent
Choon Chye et al.

(10) Patent No.: US 7,478,707 B2
(45) Date of Patent: Jan. 20, 2009

(54) BICYCLE DISC BRAKE DEVICE

(75) Inventors: Terry Ong Choon Chye, Kuala Pilah N. (MY); Osamu Kariyama, Osaka (JP)

(73) Assignee: Shimano Inc., Osaka (JP)

( * ) Notice: Subject to any disclaimer, the term of this patent is extended or adjusted under 35 U.S.C. 154(b) by 3 days.

(21) Appl. No.: 11/762,957

(22) Filed: Jun. 14, 2007

(65) Prior Publication Data
US 2008/0308363 A1 Dec. 18, 2008

(51) Int. Cl.
*B62L 3/02* (2006.01)
(52) U.S. Cl. .......................................... 188/26; 188/72.7
(58) Field of Classification Search .................... 188/26, 188/72.7–72.9
See application file for complete search history.

(56) References Cited
U.S. PATENT DOCUMENTS

| | | | |
|---|---|---|---|
| 6,230,849 B1 | 5/2001 | Lumpkin | |
| 6,431,327 B2 | 8/2002 | Lumpkin | |
| 6,491,144 B2 | 12/2002 | Ueda et al. | |
| 6,527,089 B2 * | 3/2003 | Lumpkin et al. | 188/26 |
| 6,557,671 B1 | 5/2003 | Kirimoto et al. | |
| 6,659,234 B1 * | 12/2003 | Huang | 188/26 |
| 6,945,369 B1 | 9/2005 | Chen | |

\* cited by examiner

*Primary Examiner*—Christopher P Schwartz
(74) *Attorney, Agent, or Firm*—Global IP Counselors, LLP

(57) ABSTRACT

A bicycle disc brake device includes a fixed member, an actuation unit and an adjustment structure. The fixed member includes a caliper housing. The actuation unit is coupled to the fixed member. The actuation unit is configured and arranged to move a friction member of the disc brake device from a release position to a braking position. The adjustment structure is operatively arranged to selectively orient the actuation unit relative to the fixed member in a plurality of fixed orientations.

16 Claims, 14 Drawing Sheets

BICYCLE DISC BRAKE DEVICE

BACKGROUND OF THE INVENTION

1. Field of the Invention

This invention generally relates to a bicycle disc brake device. More specifically, the present invention relates to a bicycle disc brake device, which has an actuation unit that is adjustable relative to a fixed member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, bicycle braking system components have been extensively redesigned over the years.

There are several types of bicycle brake devices, which are currently available. Examples of some types of common bicycle brake devices include rim brakes and disc brakes. Disc brakes can by hydraulically actuated or mechanically actuated. Rim brakes are typically mechanically actuated. If a brake system with very strong braking force in wet and dry conditions is desired, a disc brake system is typically utilized. Disc brake systems provide a substantial braking power in relationship to the amount of braking force applied to the brake lever. Also, disc brake systems typically provide a high level of consistency in all types of weather and riding conditions.

Conventionally, a disc brake device is composed of a pair of brake pads that are mounted to a caliper housing. The brake pads are pressed against a brake disc or brake rotor that is fixed to the wheel to halt the rotation of the disc, and thus, the rotation of the wheel. At least one of the brake pads is moved toward the disc hydraulically or mechanically (e.g. by a cam mechanism).

Hydraulic disc brake systems provide excellent performance. However, such systems are relatively complicated and expensive to manufacture and/or assemble. Moreover, hydraulic disc brake systems can be relatively heavy.

Mechanical disc brake systems typically use a conventional Bowden type cable coupled to a swinging arm. Movement of the swinging arm causes movement of one or more braking members using an intermediate mechanism such as a cam mechanism. Mechanical disc brake systems are typically less expensive and lighter weight than hydraulic disc brake systems.

In either case, prior disc brake systems utilize a front brake device mounted to the front fork and a rear disc brake device mounted on a rear fork (e.g. rear triangle or rear suspension fork). Depending on the type of frame, the exact mounting locations of the front and rear disc brake devices may vary. Depending on the mounting location, the actuation lines of typical disc brake devices are not always optimally positioned or routed along the bicycle frame. Less than optimal routing of the actuation lines can also lead to an unattractive appearance and/or complicated installation.

In view of the above, it will be apparent to those skilled in the bicycle art from this disclosure that there exists a need for an improved bicycle disc brake device. This invention addresses this need in the bicycle art as well as other needs, which will become apparent to those skilled in the bicycle art from this disclosure.

SUMMARY OF THE INVENTION

One object of the present invention is to provide a bicycle disc brake device, which provides a smooth reliable braking action.

Another object of the present invention is to provide a bicycle disc brake device, which can be conveniently mounted at various frame locations having various actuation line routing arrangements, with the actuation lines routed in a relatively optimal manner.

The foregoing objects can basically be attained by providing a bicycle disc brake device, which includes a fixed member, an actuation unit and an adjustment structure. The fixed member includes a caliper housing. The actuation unit is coupled to the fixed member. The actuation unit is configured and arranged to move a friction member of the disc brake device from a release position to a braking position. The adjustment structure is operatively arranged to selectively orient the actuation unit relative to the fixed member in a plurality of fixed orientations.

These and other objects, features, aspects and advantages of the present invention will become apparent to those skilled in the bicycle art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Embodiments of the present invention will now be explained with reference to the drawings. It will be apparent to those skilled in the bicycle art from this disclosure that the following descriptions of the embodiments of the present invention are provided for illustration only and not for the purpose of limiting the invention as defined by the appended claims and their equivalents.

Figure 1:
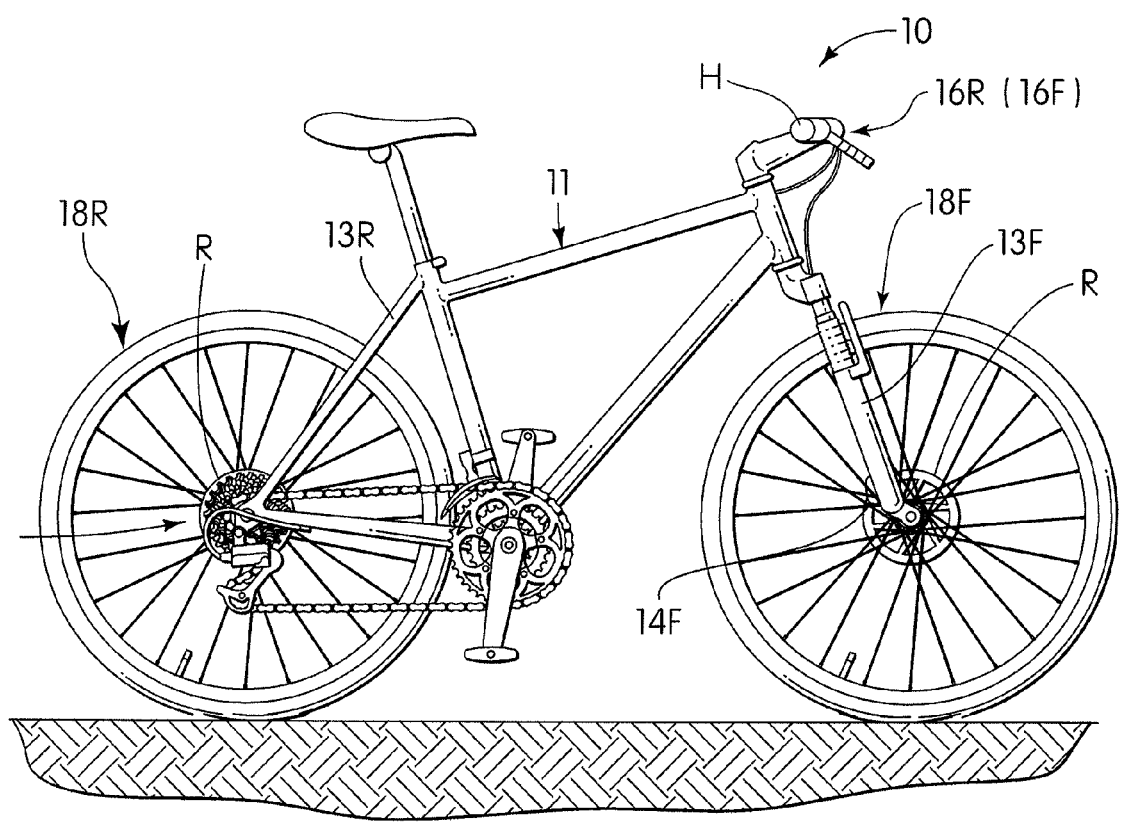
FIG. 1 is a side elevational view of a bicycle equipped with front and rear disc brake systems in accordance with a first embodiment of the present invention.
Figure 2:
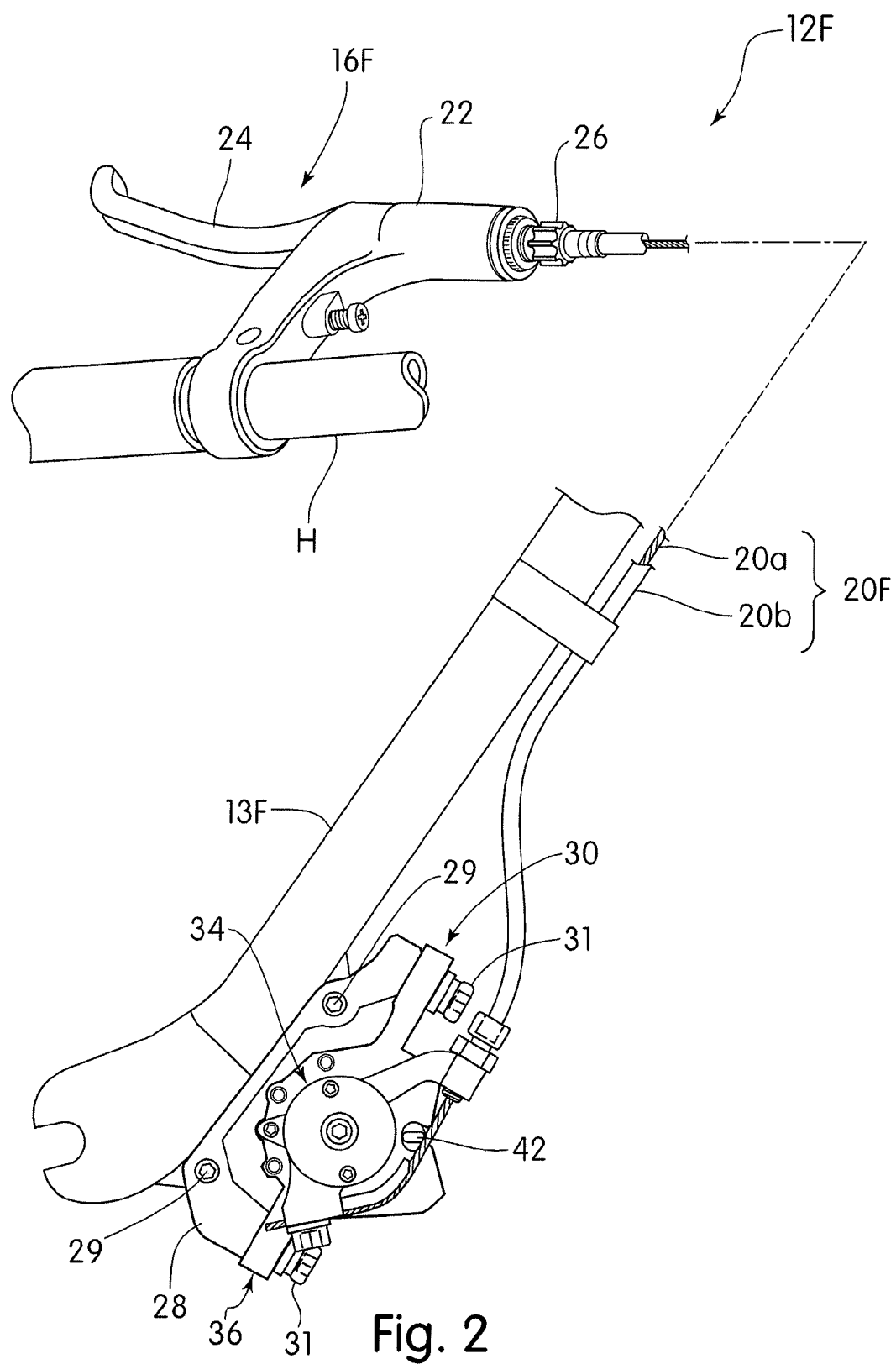
FIG. 2 is a partial side elevational/perspective view of the front disc brake system (i.e., a front disc brake device coupled to a front fork and a front disc brake controller coupled to a handle bar) of the bicycle illustrated in FIG. 1.
Figure 3:
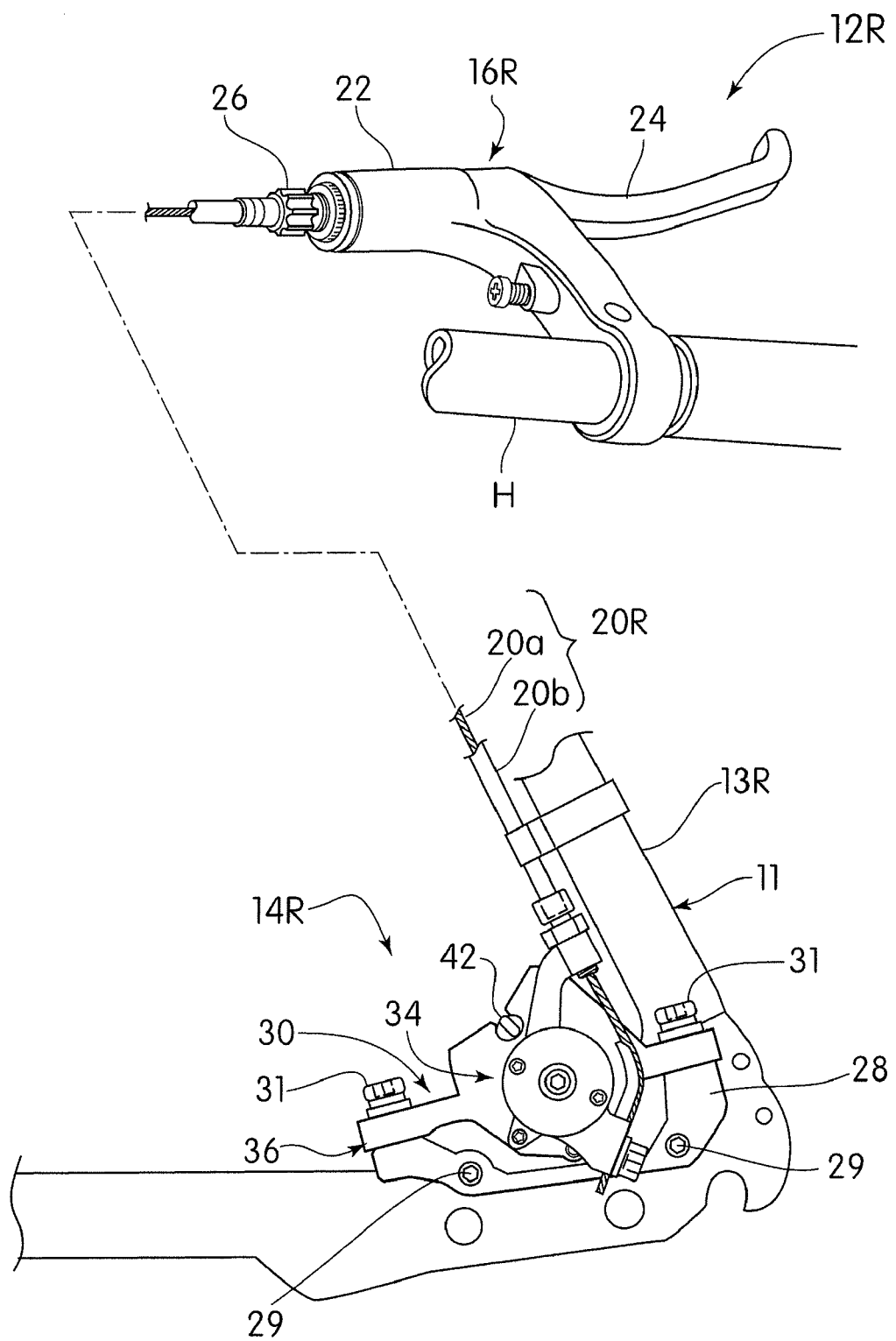
FIG. 3 is a partial side elevational/perspective view of the rear disc brake system (i.e., a rear disc brake device coupled to a rear triangle and a rear disc brake controller coupled to a handle bar) of the bicycle illustrated in FIG. 1.

Referring initially to FIGS. 1-3, a bicycle 10 equipped with front and rear bicycle disc brake systems 12F and 12R attached thereto is illustrated in accordance with a first embodiment of the present invention. The bicycle 10 is conventional, except for the front and rear bicycle disc brake systems 12F and 12R in accordance with the present invention. Accordingly, the bicycle 10 will not be explained and/or illustrated in detail herein, except as related to the front and rear bicycle disc brake systems 12F and 12R in accordance with the present invention.

The front bicycle disc brake system 12F includes a front disc brake (actuated) device 14F and a front brake operating (actuating) mechanism 16F, while the rear bicycle disc brake system 12R includes a rear disc brake (actuated) device 14R and a rear brake operating (actuating) mechanism 16R. The front and rear bicycle disc brake devices 14F and 14R are adjustable in accordance with the present invention. Specifically, each of the front and rear bicycle disc brake devices 14F and 14R includes an actuated component, which can be coupled to a fixed body in a plurality of fixed orientations, as explained below in more detail.

The front disc brake device 14F is attached to a front fork 13F of the frame 11. The front fork 13F is pivotally attached to the main portion of the frame 11 in a conventional manner. The front brake operating mechanism 16F is attached to a handlebar H. The handlebar H is attached to the front fork 13F to steer the bicycle 10 in a conventional manner. The rear disc brake device 14R is attached to a rear fork or triangle 13R of the frame 11. The rear brake operating mechanism 16R is attached to the handlebar H in a spaced arrangement from the front brake operating mechanism 16F such that the front and rear brake operating mechanisms 16F and 16R can be operating by a rider's hands in a conventional manner. A front wheel 18F is freely rotatably coupled to the front fork 13F, while a rear wheel 18R is freely rotatably coupled to the rear fork or triangle 13R. Each of the front and rear wheels 18F and 18R has a disc brake rotor R fixedly attached thereto to rotate therewith in a conventional manner.

The front and rear bicycle disc brake devices 14F and 14R are identical to each other. However, the front and rear disc brake devices 14F and 14R are mounted in different orientations on the front and rear forks 13F and 13R, respectively, as best understood from FIGS. 2 and 3. Specifically, the front disc brake device 14F is operatively connected to the front brake operating mechanism 16F with a front actuation line 20F routed along the front fork 13F, while the rear disc brake device 14R is operatively connected to the rear brake operating mechanism 16R with a rear actuation line 20R routed along the rear fork 13R. The front and rear disc brake devices 14F and 14R are mounted in different orientations in order to route the front and rear actuation lines 20F and 20R along the front and rear forks 13F and 13R of the frame 11 as illustrated herein, respectively.

Since the front and rear bicycle disc brake devices 14F and 14R are identical to each other, only the rear disc brake device 14R will be discussed and illustrated herein. However, it will be apparent to those skilled in the bicycle art from this disclosure that the descriptions and illustrations of the rear disc brake device 14R also apply to the front disc brake device 14F. Moreover, it will be apparent to those skilled in the bicycle art from this disclosure that the front and rear disc brake devices 14F and 14R can be mounted in different orientations than illustrated herein, depending on the type of frame 11 of the bicycle 10. In other words, depending on the desired mounting locations on a particular frame for the front and rear disc brake devices 14F and 14R, the front and rear disc brake devices 14F and 14R can be oriented differently than shown in FIGS. 2 and 3, as explained below in more detail.

The front and rear brake operating mechanisms 16F and 16R are identical to each other, except that the front and rear brake operating mechanisms 16F and 16R are mirror images of each other. Moreover, the front and rear brake operating mechanisms 16F and 16R are conventional and well known in the bicycle art. Accordingly, the front and rear brake operating mechanisms 16F and 16R will not be discussed or illustrated in detail herein.

Basically, the front brake operating mechanism 16F is designed to actuate the front disc brake device 14F to stop rotation of front wheel 18F. More specifically, the front brake operating mechanism 16F is operatively coupled to the front disc brake device 14F by the front actuation line 20F to apply a forcible gripping action on the disc brake rotor R that is fixedly coupled to the front wheel 18F. Likewise, the rear brake operating mechanism 16R is designed to actuate the rear disc brake device 14R to stop rotation of rear wheel 18R.

More specifically, the rear brake operating mechanism 16R is operatively coupled to the rear disc brake device 14R by the rear actuation line 20R to apply a forcible gripping action on the disc brake rotor R that is fixedly coupled to the rear wheel 18R.

In the illustrated embodiment, the front and rear disc brake systems 12F and 12R are mechanical disc brake systems. More specifically, in the illustrated embodiment, the front and rear disc brake systems 12F and 12R are cable actuated disc brake systems. Thus, in the illustrated embodiment, the front and rear brake operating mechanisms 16F and 16R are cable actuating mechanisms, the front and rear disc brake devices 14F and 14R are cable actuated mechanisms (i.e., cable disc brake devices), and the front and rear actuation lines 20F and 20R are conventional Bowden cables. Accordingly, each actuation line 20F and 20R has an inner wire 20a slideable within an outer casing 20b in a conventional manner.

Each of the front and rear brake operating mechanisms 16F and 16R preferably includes a mounting member 22 attached to the handlebar H and a brake lever 24 pivotally supported by the mounting member 22 in a conventional manner. A barrel adjuster 26 is attached to each mounting member 22. The inner wires 20a extend through the barrel adjusters 26 and are attached to the brake levers 24 in a conventional manner. The outer casings 20b are received in recesses of the barrel adjusters 26 in a conventional manner. Normally, a biasing member such as a return spring (not shown) biases each brake lever 24 to a non-brake actuating position from a brake actuating position in a conventional manner. When the rider moves a respective brake lever 24 to it's respective brake actuating position, a respective inner wire 20a is pulled to actuate it's respective disc brake device 14F or 14R.

Referring to FIGS. 3-12, the rear disc brake device 14R will now be explained in more detail. The rear disc brake device 14R is attached to the rear fork or triangle 13R using a mounting bracket 28. Specifically, the mounting bracket 28 is fixedly attached to the rear fork 13R using a pair of fasteners 29 such as threaded bolts. The mounting bracket 28 has a substantially U-shaped configuration. The rear disc brake device 14R is attached to the mounting bracket 28 using an additional pair of fasteners 31 such as threaded bolts. Of course, it will be apparent to those skilled in the bicycle art from this disclosure that various other types of mounting arrangements can be utilized as needed and/or desired.

The rear disc brake device 14R basically includes a caliper housing 30, a pair of brake pads or friction members 32 and an actuation unit 34. The caliper housing 30 is fixedly attached to the mounting bracket 28 using the additional pair of fasteners 31. The brake pads 32 are movably attached to the caliper housing 30 to form a rotor receiving slot therebetween. One of the disc brake rotors R received in the rotor receiving slot, as best understood from FIGS. 5, 11 and 12. The actuation unit 34 is adjustably attached to the caliper housing 30 to move the brake pads 32 into engagement with the disc brake rotor R disposed between the friction pads 32 in response to movement of the brake lever 24 of the rear brake operating mechanism 16R from the non-brake actuating position to the brake actuating position.

Figure 5:
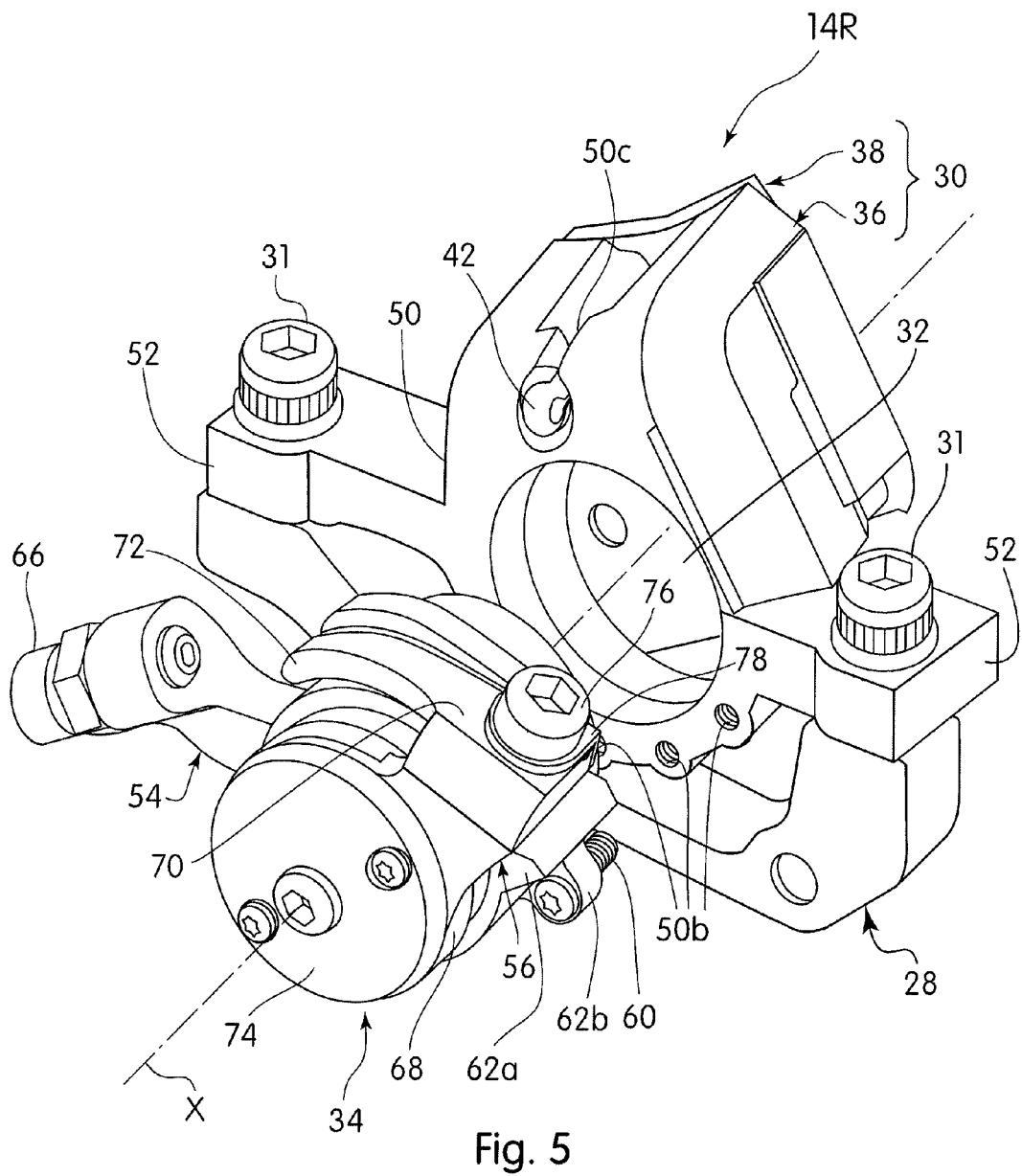
FIG. 5 is an enlarged, partially exploded, perspective view of the rear disc brake device illustrated in FIGS. 3-4.
Figure 6:
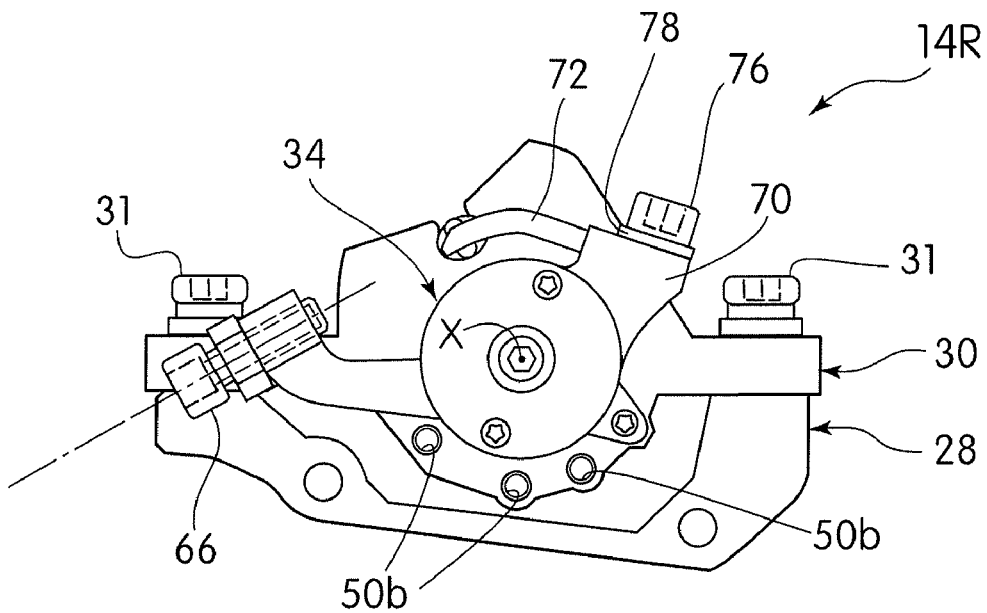
FIG. 6 is a side elevational view of the rear disc brake device illustrated in FIGS. 3-5, with the actuation unit arranged in a first, fixed orientation relative to the fixed member.
Figure 7:
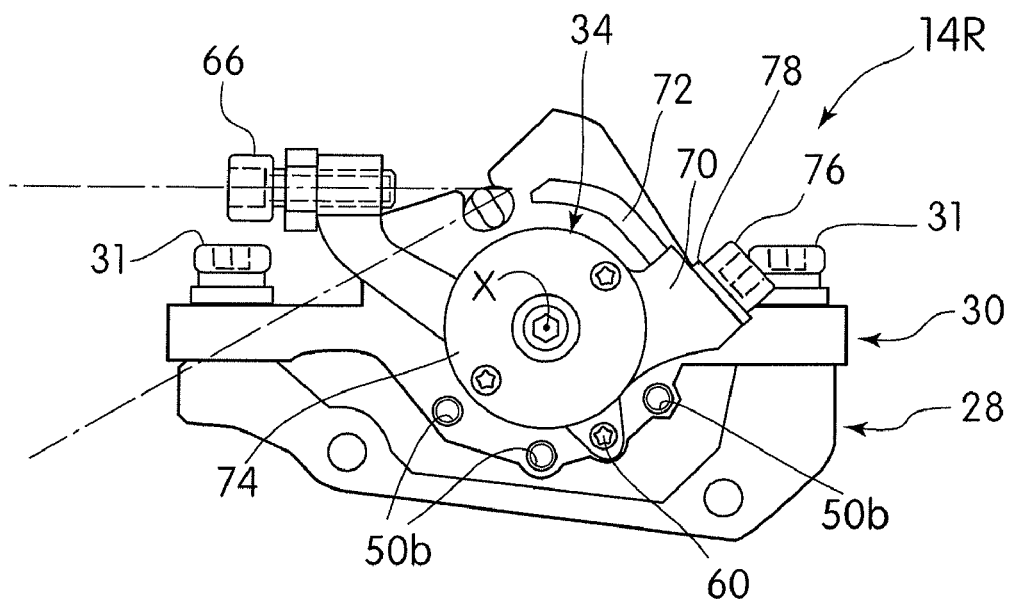
FIG. 7 is a side elevational view of the rear disc brake device illustrated in FIGS. 3-5, with the actuation unit arranged in a second, fixed orientation relative to the fixed member.
Figure 8:
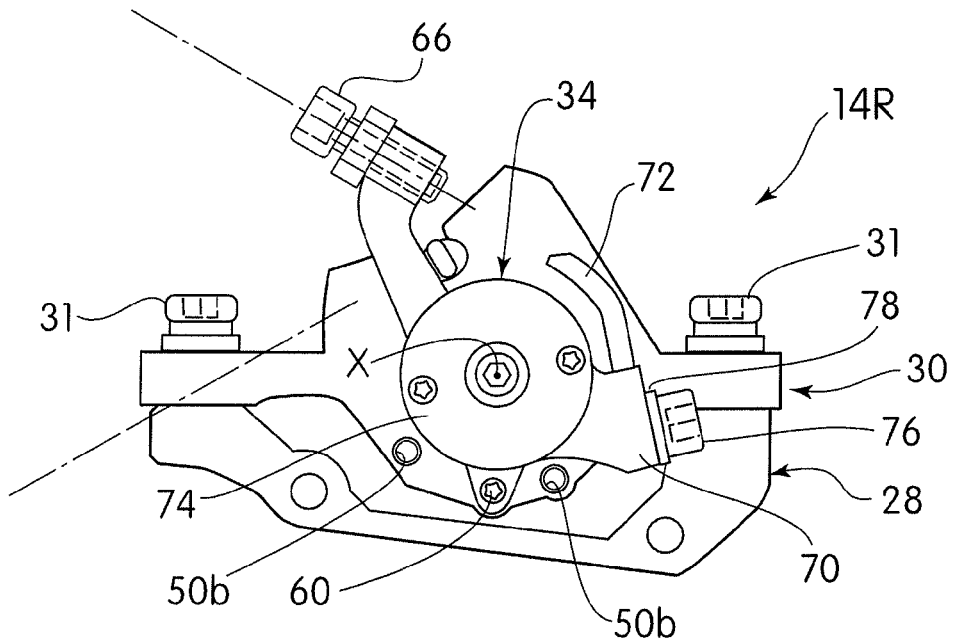
FIG. 8 is a side elevational view of the rear disc brake device illustrated in FIGS. 3-5, with the actuation unit arranged in a third, fixed orientation relative to the fixed member.
Figure 9:
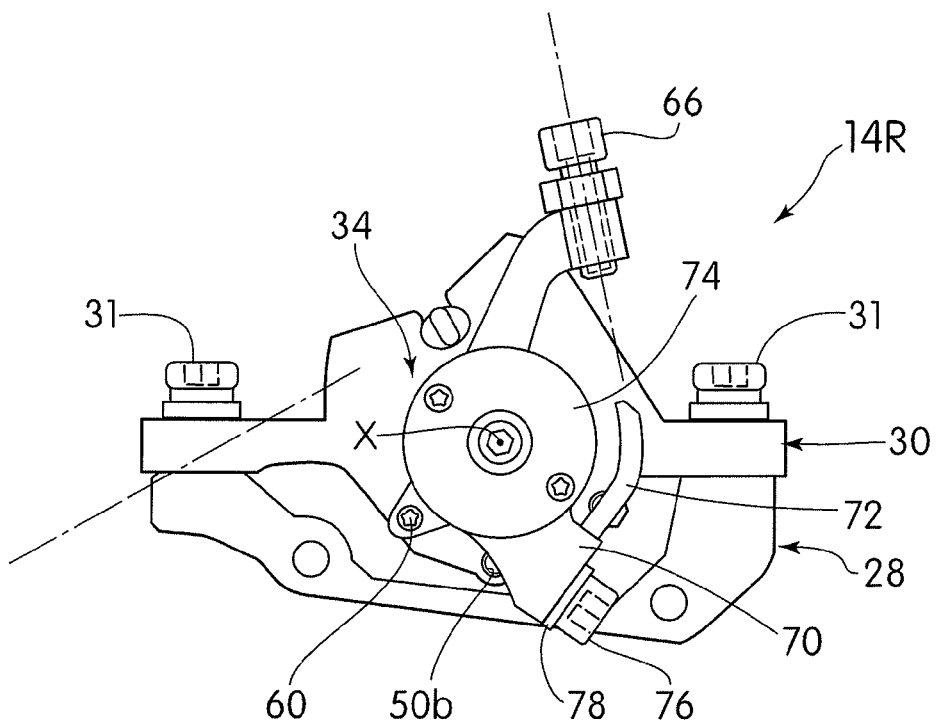
FIG. 9 is a side elevational view of the rear disc brake device illustrated in FIGS. 3-5, with the actuation unit arranged in a fourth, fixed orientation relative to the fixed member.
Figure 11:
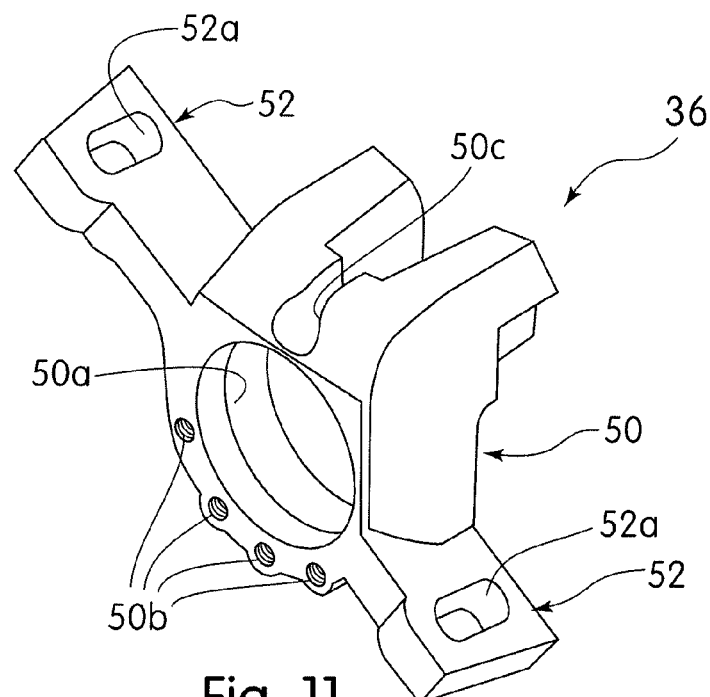
FIG. 11 is an enlarged perspective view of the main housing member of the rear disc brake device illustrated in FIGS. 3-9.
Figure 12:
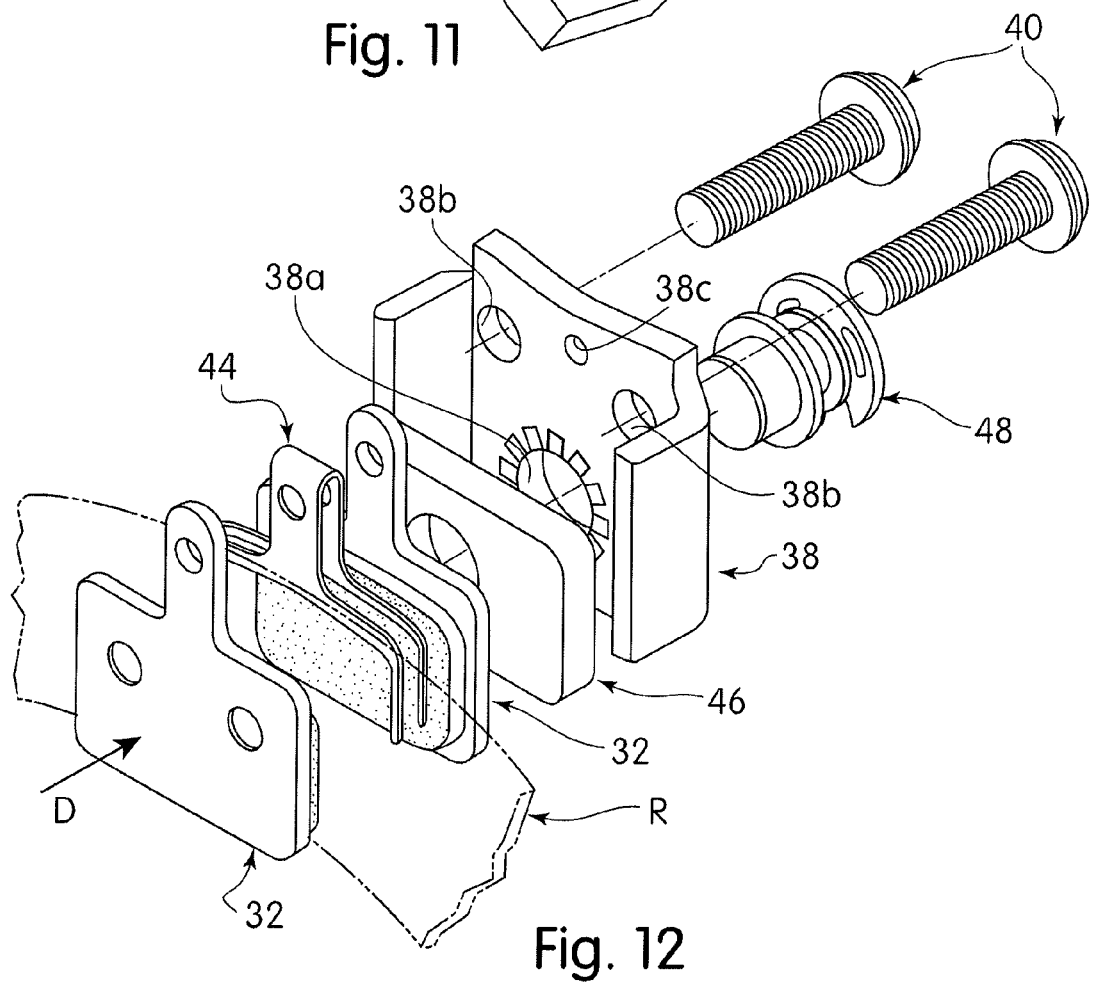
FIG. 12 is an enlarged, exploded perspective view of the secondary housing member and brake (friction) pad assembly of the rear disc brake device illustrated in FIGS. 3-9.
Figure 13:
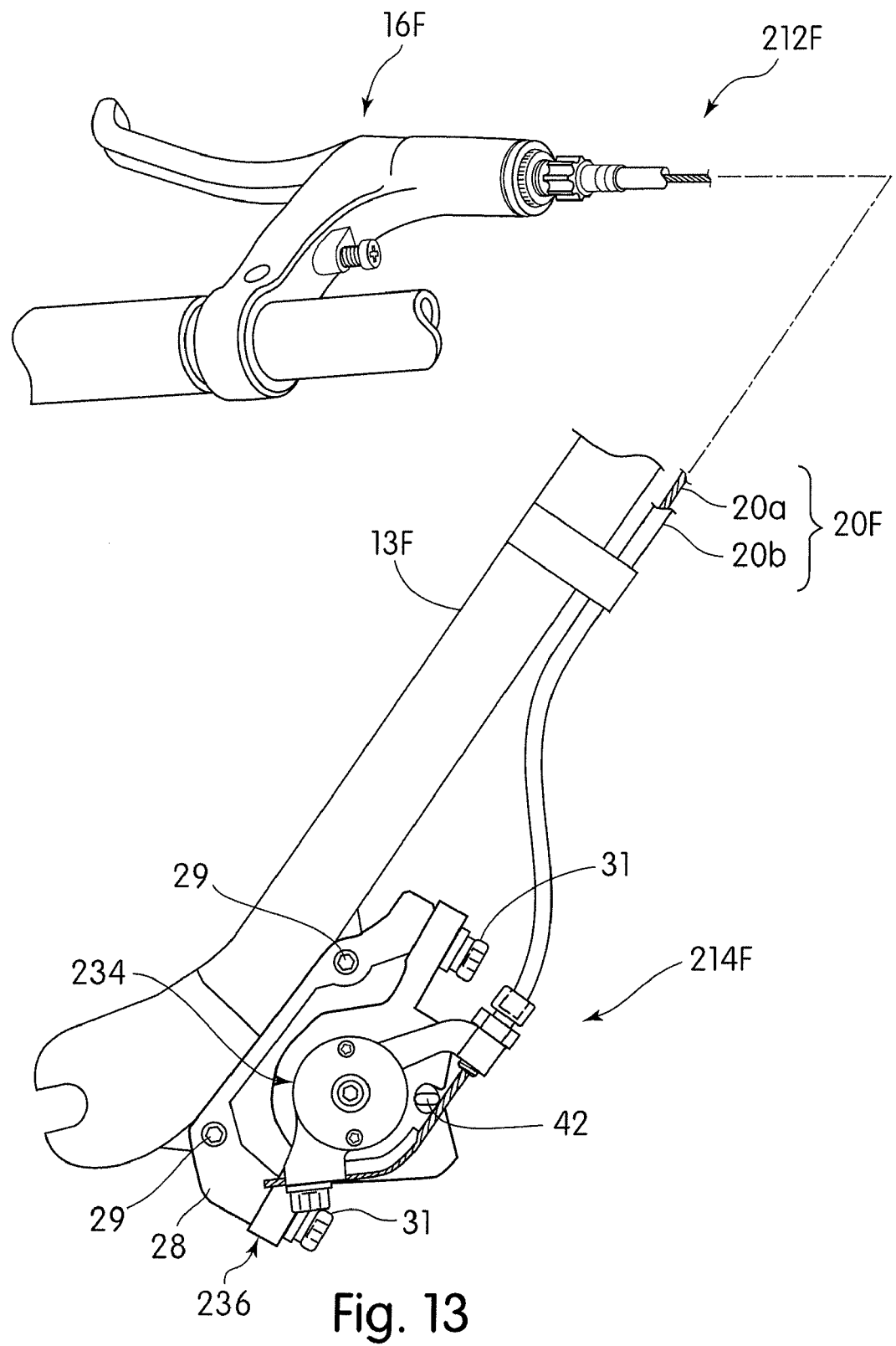
FIG. 13 is a partial side elevational/perspective view of a front disc brake system (i.e., a front disc brake device coupled to a front fork and a front disc brake controller coupled to a handle bar) in accordance with a second embodiment of the present invention.
Figure 14:
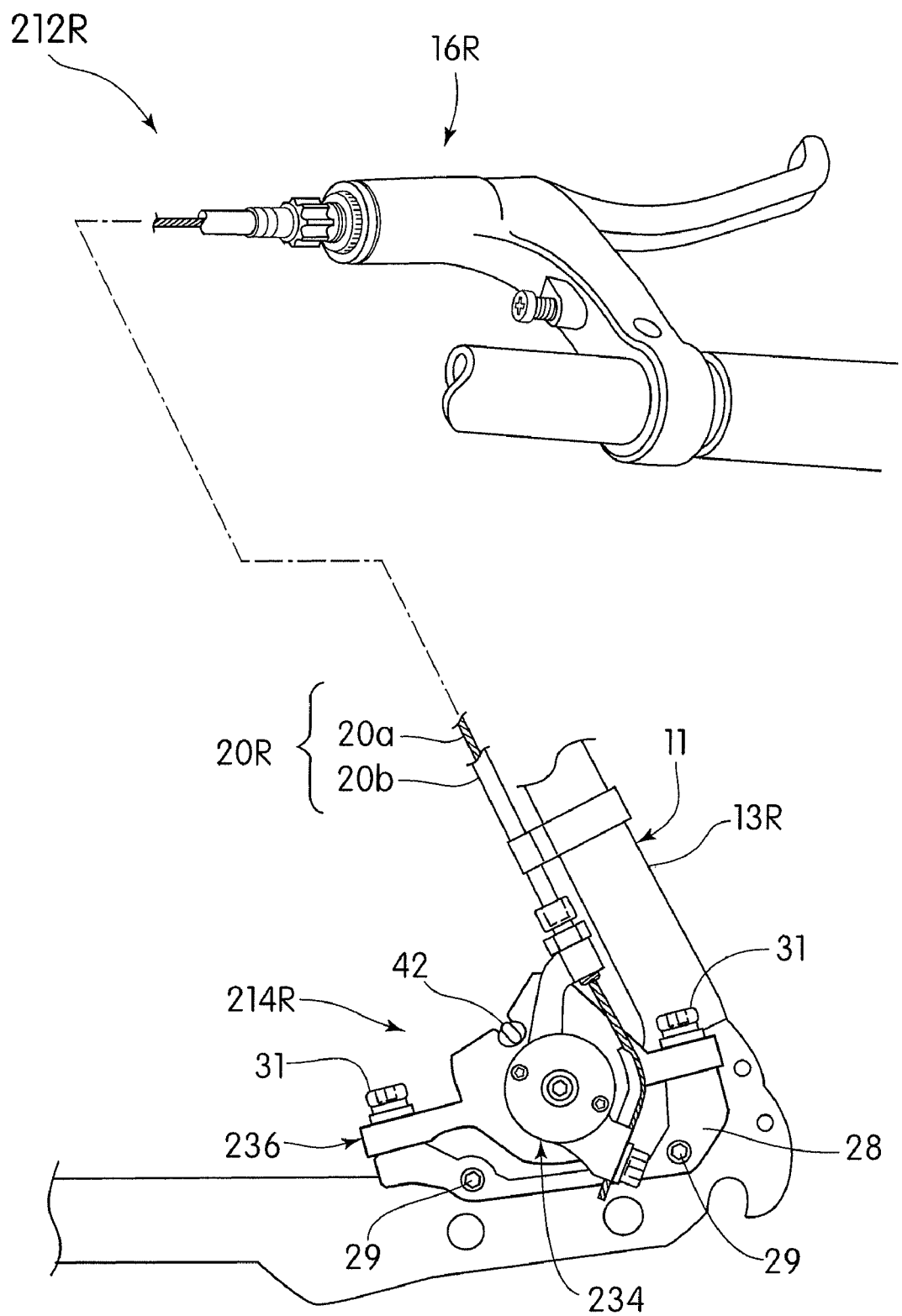
FIG. 14 is a partial side elevational/perspective view of a rear disc brake system (i.e., a rear disc brake device coupled to a rear triangle and a rear disc brake controller coupled to a handle bar) in accordance with a second embodiment of the present invention.
Figure 15:
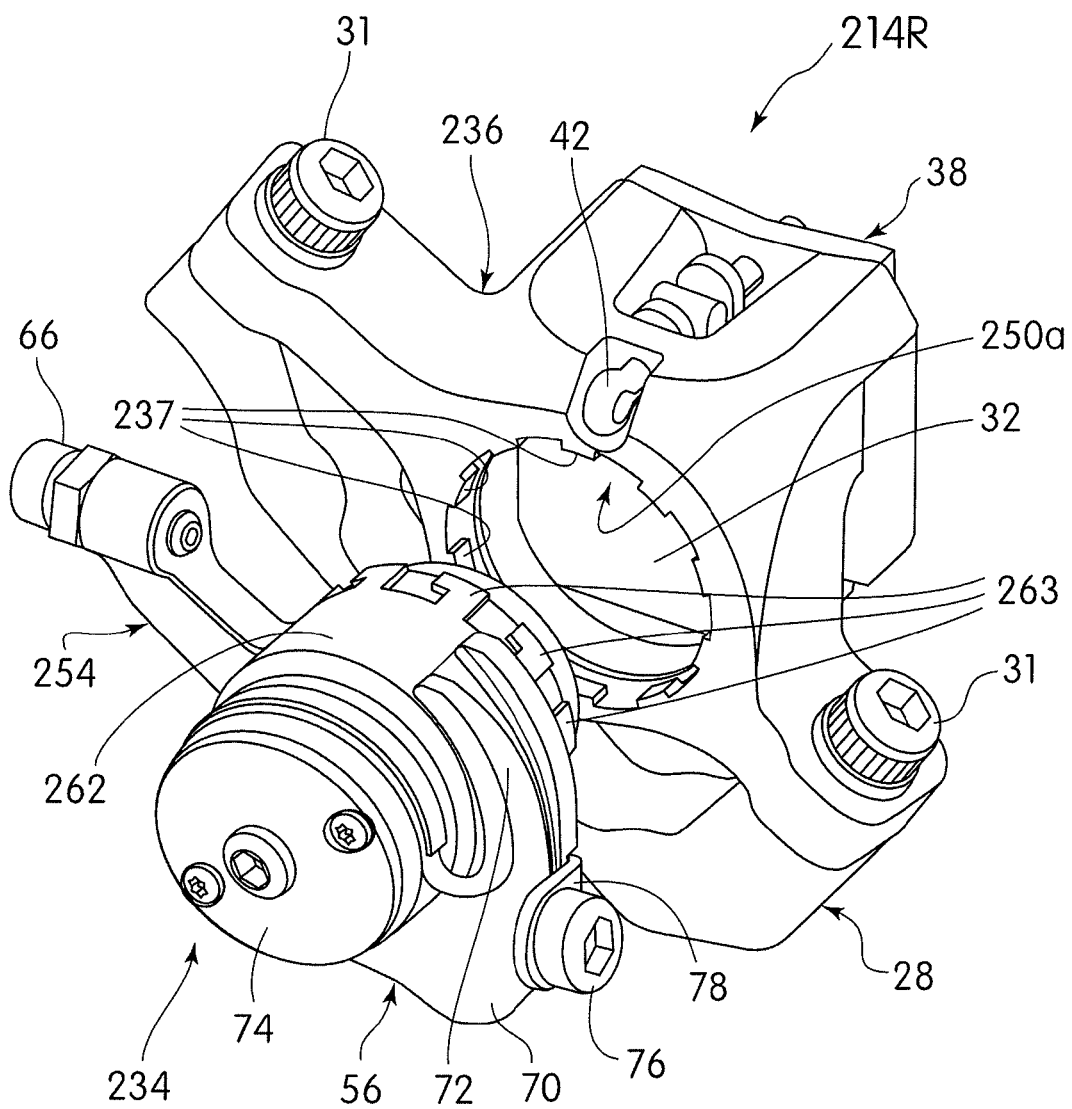
FIG. 15 is an enlarged, partially exploded, perspective view of the rear disc brake device illustrated in FIG. 14.
Figure 16:
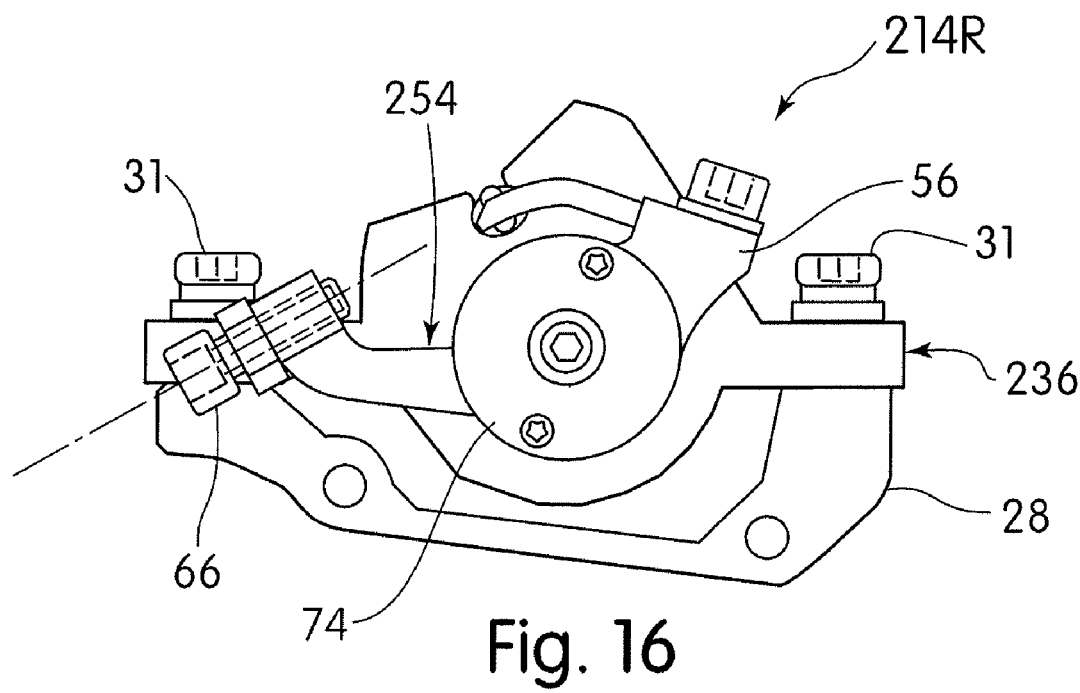
FIG. 16 is a side elevational view of the rear disc brake device illustrated in FIGS. 14-15, with the actuation unit arranged in a first, fixed orientation relative to the fixed member.
Figure 17:
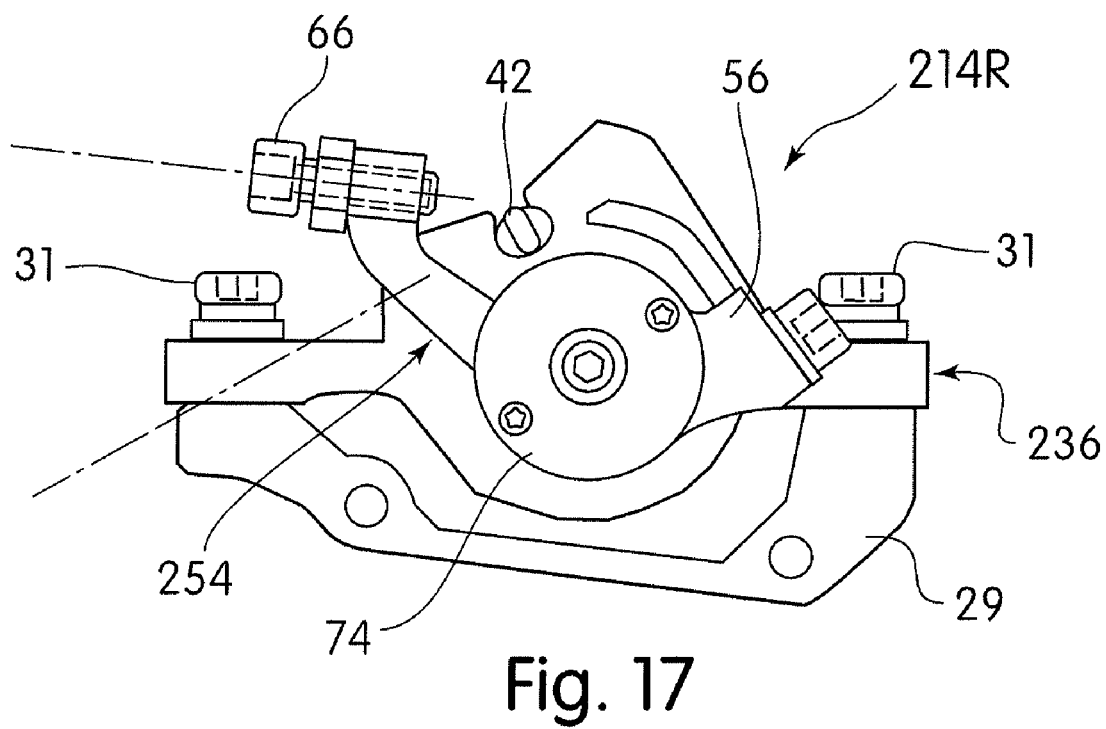
FIG. 17 is a side elevational view of the rear disc brake device illustrated in FIGS. 14-15, with the actuation unit arranged in a second, fixed orientation relative to the fixed member.
Figure 18:
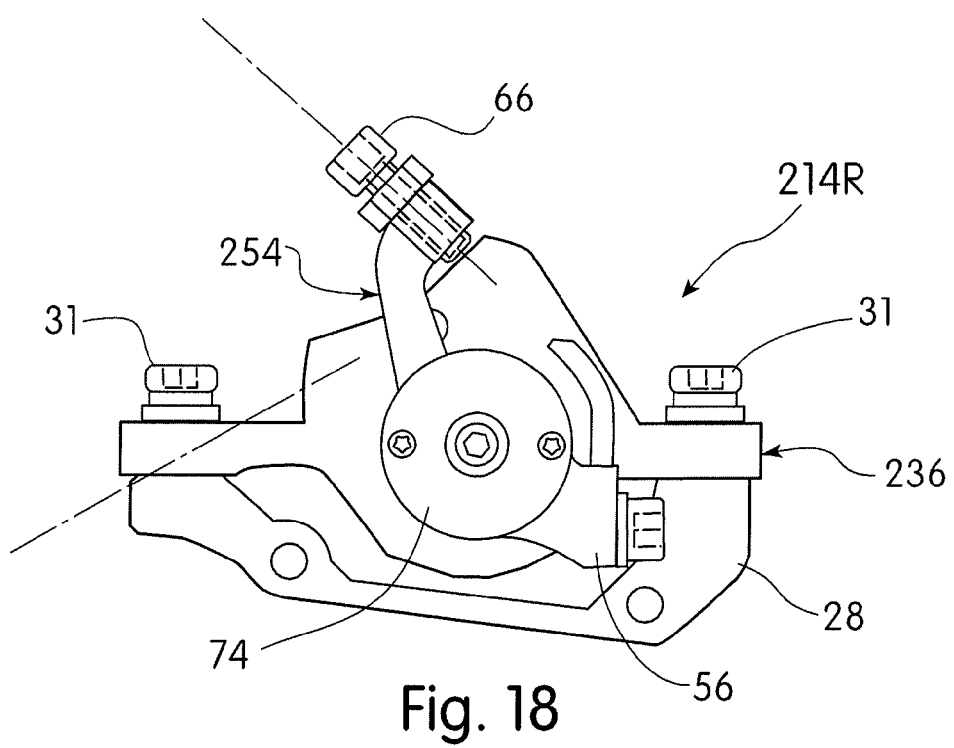
FIG. 18 is a side elevational view of the rear disc brake device illustrated in FIGS. 14-15, with the actuation unit arranged in a third, fixed orientation relative to the fixed member.
Figure 19:
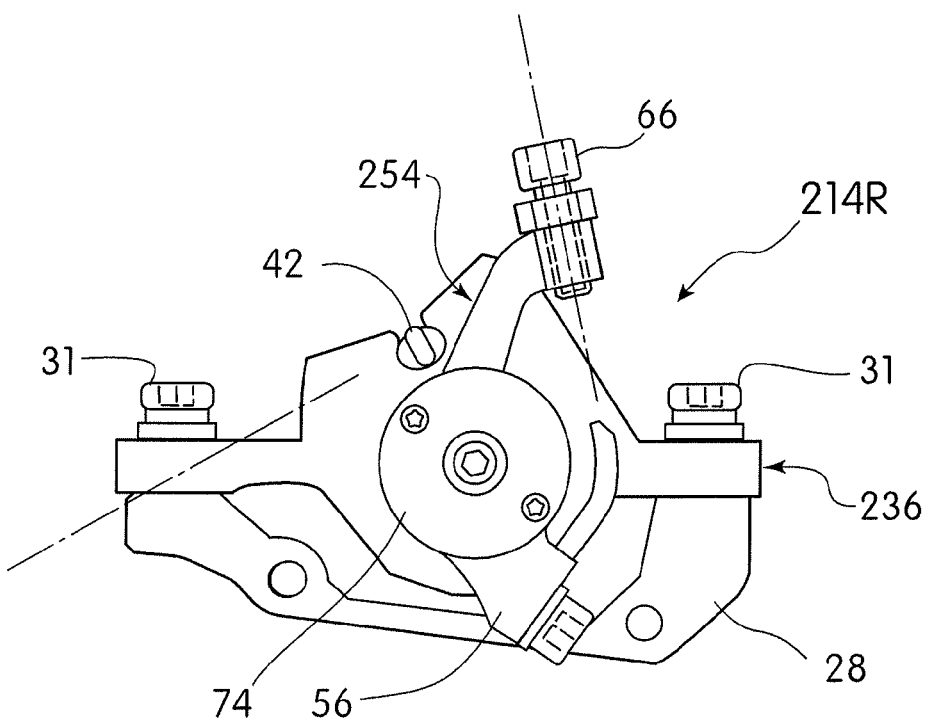
FIG. 19 is a side elevational view of the rear disc brake device illustrated in FIGS. 14-15, with the actuation unit arranged in a fourth, fixed orientation relative to the fixed member.

Referring to FIGS. 5, 11 and 12, the caliper housing 30 basically includes a main housing member 36 and a secondary housing member 38 that are fixedly attached to each other using a pair of fasteners 40 such as threaded bolts. The housing members 36 and 38 are each preferably constructed of a hard, rigid material, such as a metallic material. Of course, other suitable materials can be utilized if needed and/or desired. When the housing members 36 and 38 are attached together, a recessed area and slot are formed therebetween to receive one of the disc brake rotors R and the friction pads 32 on opposite sides of the disc brake rotor R. The brake pads 32 are movably coupled to the caliper housing 30 (i.e., the housing members 36 and 38) using a support member 42 such as a cotter pin. Specifically, the brake pads 32 are laterally slideably supported on the support member 42 with the disc brake rotor R disposed therebetween. A biasing member 44 is disposed between the brake pads 32 to bias the brake pads 32 out of engagement with the disc brake rotor R disposed therebetween in a conventional manner.

One of brake pads 32 is mounted adjacent the main housing member 36 in order to be moved laterally by the actuation unit 34. The other brake pad 32 is disposed adjacent the secondary housing member 38 with a support block 46 disposed therebetween. The support block 46 is coupled to the secondary housing member 38 using a retaining member 48. Normally, the brake pad 32 arranged immediately adjacent to the support block 46 remains substantially stationary. On the other hand, the brake pad 32 arranged adjacent the main housing member 36 is configured and arranged to be moved in a braking direction D from a release position to a braking position by the actuation unit 34 (cable actuated mechanism), as explained below. During this movement, the rotor R will move laterally slightly in order to engage the substantially stationary brake pad 32 adjacent the support block 46. In the release position, both of the pads 32 are at least slightly spaced from the disc brake rotor R to allow free rotation thereof. In the braking position, the brake pads 32 are pressed against the sides of the disc brake rotor R to stop rotation of the bicycle wheel 18R.

Referring still to FIGS. 5, 11 and 12, the main housing member 36 basically includes a body portion 50 and a pair of mounting flanges 52. Preferably, the main body portion 50 and the mounting flanges 52 are integrally formed together as a one-piece, unitary member using conventional manufacturing techniques such as casting and/or machining. The flanges 52 extend from opposite ends of the body portion 50 in a parallel arrangement. Each of the flanges 52 has an elongated slot 52a formed therein, which receives one of the fasteners 31 in order to fixedly attach the main housing member 36 to the mounting bracket 28. Due to the slots 52a, the lateral position of the main housing member 36 relative to the bracket 28 can be adjusted if needed. Thus, the lateral position of the caliper housing 30 relative to the mounting bracket 28 can be laterally adjusted if needed.

The body portion 50 includes an enlarged lateral bore 50a and a plurality of angularly spaced adjustment bores 50b disposed about a fixed center or pivot axis X of the enlarged bore 50a, as best understood from FIGS. 5-9 and 11. The center/pivot axis X is preferably parallel to the braking direction D The enlarged lateral bore 50a is a through bore that is aligned with the brake pads 32. The actuation unit 34 is partially received in the enlarged lateral bore 50a in order to engage one of the friction pads 32. The adjustment bores 50b preferably extend in a parallel arrangement to the enlarged later bore 50a.

Preferably, the adjustment bores 50b are blind, threaded bores that are arranged at 0°, 30°, 60° and 108° about the center/pivot axis X in a clockwise direction. The actuation unit 34 is attached in one of the adjustment bores 50b. In other words, the adjustment bores 50b utilized in FIGS. 6-9 (i.e., with the actuation unit 34 attached therein) correspond to 0°, 30°, 60° and 108° fixed orientations of the actuation unit 34 relative to the caliper housing 30 about the center axis X, respectively. The support member 42 is received in a cutout or notch 50c formed in the upper surface of the body portion 50.

The side of the body portion 50 facing the secondary housing member 38 is shaped to non-rotatably support one of the brake pads 32.

The secondary housing member 38 basically has a U-shaped configuration as viewed from above so that the support block 46 and one of the brake pads 32 are non-rotatably supported within a recessed area of the secondary housing member 38. The secondary housing member 38 has a retaining hole 38a, pair of mounting holes 38b and a support hole 38c. The retaining hole 38a receives the retaining member 48. The mounting holes 38b receive the fasteners 40 therethrough. The support hole 38c receives the support member 42 therethrough. The secondary housing member 38 is preferably formed as a one-piece, unitary member. In the illustrated embodiment, the mounting bracket 28 and the caliper housing 30 (i.e., the main housing member 36 and the secondary housing member 38) constitute parts of a fixed member that is non-movably attached (fixed) to the rear fork 13R.

Figure 4:
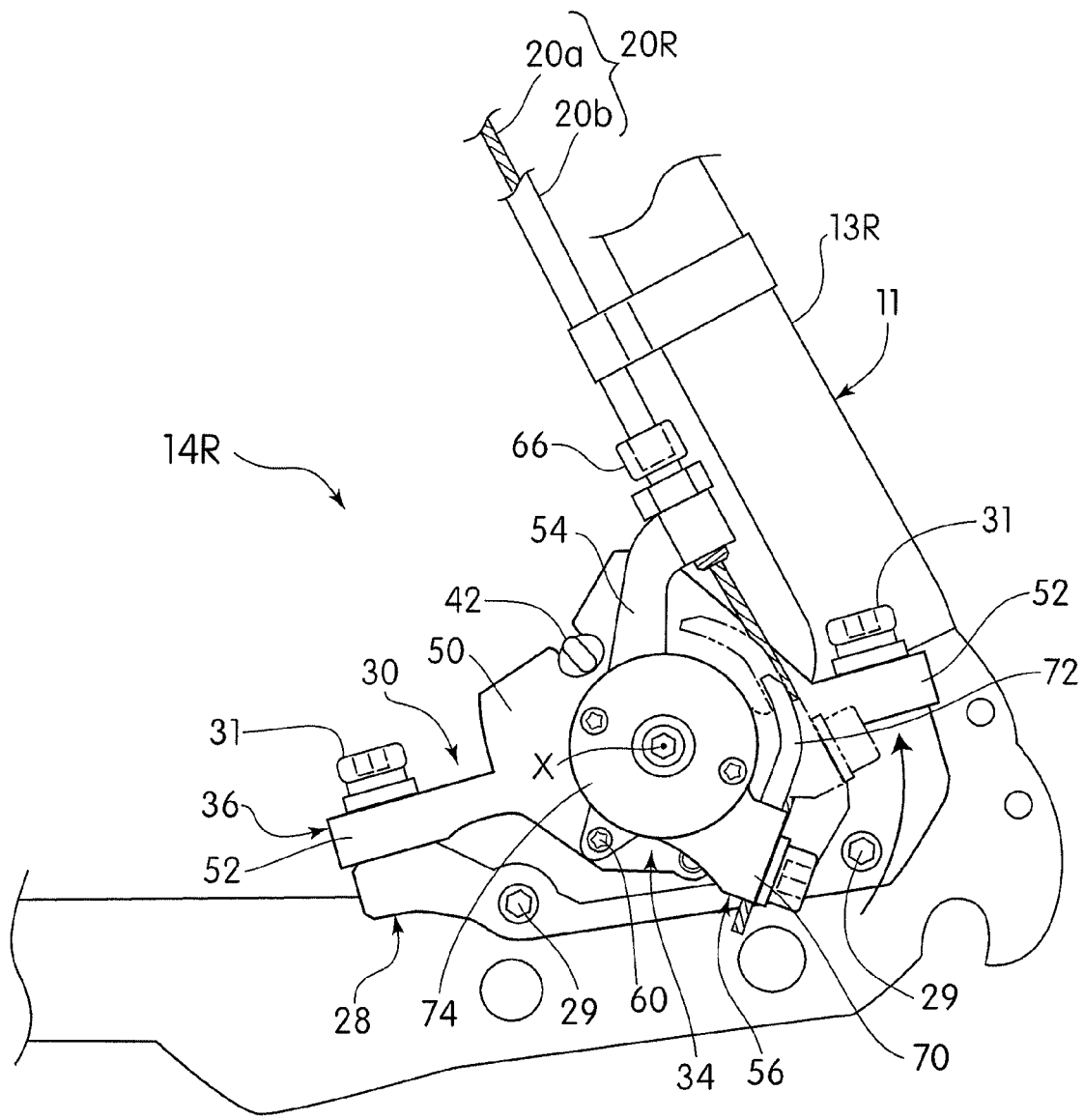
FIG. 4 is an enlarged side elevational view of the portion of the rear triangle and the rear disc brake device illustrated in FIG. 3.

Referring now to FIGS. 4-10, the actuation unit 34 will now be explained in more detail. The actuation unit 34 basically includes a mounting member 54, an actuation arm 56 and a cam mechanism 58. The mounting member 54 is non-movably attached to the main housing member 36 using a fastener 60 in one of the plurality of fixed orientations mentioned above. The actuation arm 56 is pivotally coupled to the mounting member 54 for movement about the center axis X between a rest position and an actuated position (brake actuating position), as best shown in FIG. 4. The cam mechanism 58 is supported by the mounting member 54 and the actuation arm 56 to move the brake pad 32 adjacent the body portion 50 toward the other brake pad 32 in response to pivotal movement of the actuation arm 56 from the rest position to the actuated position (brake actuating position) to apply a braking force on the disc brake rotor R. The rest position of the actuation arm 56 relative to the mounting member 54 is preferably fixed, regardless of the fixed orientation of the actuation unit 34.

The mounting member 54 basically includes a tubular element 62 and a support element 64 extending from the tubular element 62. The tubular element 62 and the support element 64 are preferably integrally formed together as a one-piece, unitary member from a light weight, rigid material such as a metallic material or hard plastic material using conventional manufacturing techniques such as casting and/or machining. The tubular element 62 is preferably non-movably attached to the main housing member 36 using the fastener 60, which is threaded attached in one of the adjustment holes 50b. Thus, the support element 64 is also non-movably attached to the main housing member 36.

The tubular element 62 receives part of the cam mechanism 58 therein. The tubular element 62 has a stop member 62a extending radially outwardly from an outer surface thereof, and an adjustment flange 62b disposed adjacent the stop member 62a. The stop member 62a is arranged to contact the actuation arm 56 in the rest position. The actuation arm 56 is preferably biased relative to the mounting member 54 toward the rest position (clockwise) from the actuated position by an internal biasing member (not shown) such as a coiled torsion spring in a relatively conventional manner. The adjustment flange 62b receives the fastener 60 therethrough. The fastener 60 is threadedly attached within one of the adjustment bores 50b such that the mounting member 54, and thus, the actuation arm 56 are attached to the main housing member 36 in one of the fixed orientations illustrated in FIGS. 6-9.

The support element 64 preferable has a threaded through bore with a barrel adjuster 66 threadedly received therein. The barrel adjuster 66 is conventional, and thus, will not be discussed and/or illustrated in detail herein. However, the angular orientation of the barrel adjuster 66 can be varied about the center axis X in accordance with the present invention, as best seen in FIGS. 6-9. In particular, due to the arrangement of the adjustment bores 50b, the barrel adjuster 66 can be adjusted between 0°, 30°, 60° and 108° about the center axis X in a clockwise direction, as seen in FIGS. 6-9. The barrel adjuster 66 guides the inner wire 20a of the rear brake cable 20R onto the actuation arm 56.

The actuation arm 56 basically includes a main body portion 68, a cable attachment portion 70 and a curved wire guide portion 72. The main body portion 68, the cable attachment portion 70 and the curved wire guide portion are preferably integrally formed together as a one-piece, unitary member from a light weight, rigid material such as a metallic material or hard plastic material using conventional manufacturing techniques such as casting and/or machining. The main body portion 68 is preferably attached to part of the cam mechanism 58 so that the actuation arm is retained with the tubular element 62. The curved wire guide portion 72 is an arc-shaped portion that extends circumferentially counter clockwise from the cable attachment portion 70. A cap or cover member 74 is attached to the main body portion 68.

The wire attachment portion 70 has a threaded bore 70a that receives a wire attachment bolt 76. A wire attachment plate 78 is disposed between the head of the wire attachment bolt 76 and the wire attachment portion 70. The wire attachment portion 70 preferably has a wire receiving groove 70b smaller than the inner wire 20a attached thereto so as to fixedly attach the inner wire 20a to the wire attachment portion 70 by squeezing the inner wire 20a between the wire attachment plate 78 and the wire attachment portion 70 within the groove 70b. The groove 70b of the wire attachment portion 70 is aligned with a wire guide groove 72a of the curved wire guide portion 72. That wire attachment portion 70 normally contacts the stop member 62a of the mounting member 54 in the rest position.

Figure 10:
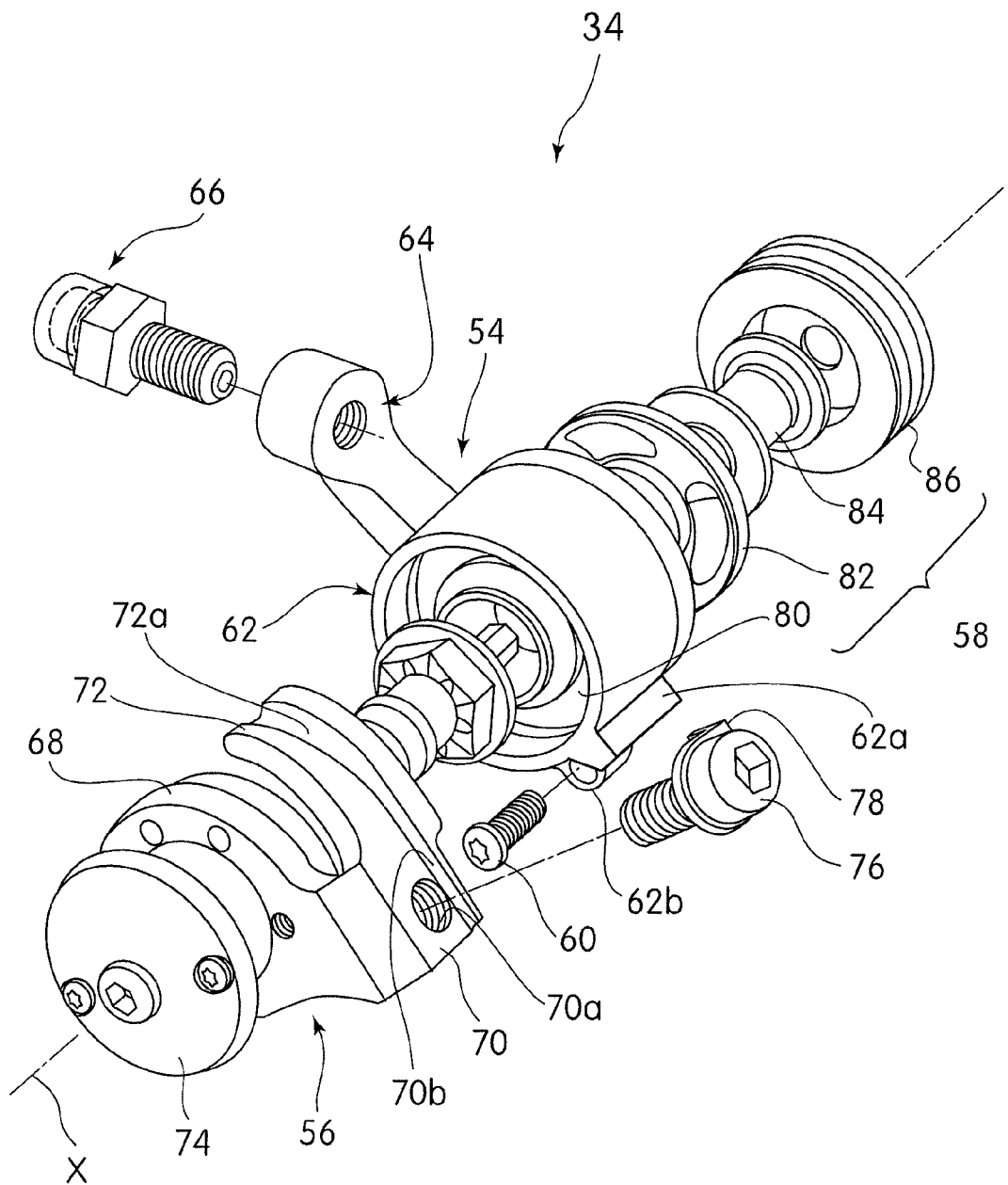
FIG. 10 is an enlarged, exploded perspective view of the actuation unit of the rear disc brake device illustrated in FIGS. 3-9.

Referring mainly to FIG. 10, the cam mechanism 58 will now be explained in more detail. The cam mechanism 58 basically includes an input cam 80, an output cam 82, a shaft member 84, a pad pressing member 86 and a set of rolling members (not shown). The shaft member 84 supports the input cam 80 and the output cam 82 for rotation about the center axis X. The input cam 80 rotates when the actuation arm 56 rotates. The rolling members are disposed between cooperating surfaces of the input cam 80 and the output cam 82 so that rotation of the input cam 80 causes the output cam 82 to move axially along the center axis X to move the pad pressing member 86 against the brake pad 32 adjacent the cam mechanism 58 toward the opposing brake pad 32. An additional biasing member (not shown) such as a compression spring biases the output cam axially away from the brake pads 32.

The precise construction of the cam mechanism 58 is not critical to the present invention, and thus, will not be explained in further detail herein. Rather, it will be apparent to those skilled in the bicycle art from this disclosure that any suitable cam mechanism can be used in conjunction with the present invention. For example, the cam mechanism 58 can be constructed in accordance with U.S. Pat. No. 6,557,671, assigned to Shimano, Inc. In other words, it will be apparent to those skilled in the bicycle art from this disclosure that any mechanism, which converts rotational movement of the actuation arm 56 into axial movement of one of the brake pads 32 can be utilized in accordance with the present invention.

In this embodiment, the parts of the actuation unit 34 that do not move relative to fixed member (e.g., the mounting bracket 28 and the caliper housing 30) once the actuation unit 34 is attached to the caliper housing 30 in one of the fixed orientations constitute parts of a stationary portion of the actuation unit 34. On the other hand, the parts of the actuation unit 34 that do move relative to fixed member (e.g., the mounting bracket 28 and the caliper housing 30) once the actuation unit 34 is attached to the caliper housing 30 in one of the fixed orientations constitute parts of a movable portion of the actuation unit 34.

The support element 64 and the barrel adjuster 66 constitute parts of an actuating line guide element of the stationary portion. Thus, the actuating line guide element includes an outer casing receiving recess (i.e., the outer casing receiving recess of the barrel adjuster 66) and an inner wire receiving bore (i.e., the through bore of the barrel adjuster 66). On the other hand, the actuation arm 56 and the cam mechanism 58 constitute parts of an actuated element of the movable portion that is movable (i.e., pivotal) relative to the stationary portion from a rest position to a brake actuating position to move the one of the brake pads 32 from the release position to the braking position. The wire attachment portion 70, the wire attachment bolt 76 and the wire attachment plate 78 constitute parts of an inner wire attachment point of the actuated element.

The fastener 60, the adjustment flange 62b and the adjustment bores 50b constitute parts of an adjustment structure operatively arranged between the fixed member (e.g., the mounting bracket 28 and the caliper housing 30) and the actuation unit 34 to selectively orient the actuation unit 34 relative to the fixed member in a plurality of fixed orientations. In particular, the adjustment structure is arranged to selectively orient the stationary portion of the actuation unit 34 relative to the fixed member in the plurality of fixed orientations. The movable portion is preferably arranged in constant orientation relative to the stationary portion. Thus, the adjustment structure is further operatively arranged to selectively orient the movable portion of the actuation unit 34 relative to the fixed member in the plurality of fixed orientations. In other words, the actuating line guide element and the inner wire attachment portion remain in constant orientations relative to each other in the plurality of fixed orientations when the actuated member is in the rest position.

In the illustrated embodiment, the plurality of fixed orientations of the actuation unit 34 relative to the fixed member (e.g., the mounting bracket 28 and the caliper housing 30) are disposed at circumferentially spaced predetermined fixed positions (i.e., four fixed positions) that are not infinitely adjustable, as seen in FIGS. 6-9. The phrase "fixed orientations" as used herein should not be construed to limit the present invention to a finite number of circumferentially spaced orientations, but rather should be construed to encompass an infinite number of fixed orientations. However, the phrase predetermined fixed positions as used herein should be construed not to include positions formed by an infinitely adjustable adjustment structure.

The adjustment flange 62b constitutes a first mounting structure of the actuation unit 34, the plurality of adjustment bores 50b constitute a second mounting structure of the fixed member, and the fastener 60 constitutes an intermediate member that is engageable with the first and second mounting structures in the plurality of fixed orientations. The first and second mounting structures and the intermediate member constitute parts of the adjustment structure. Accordingly, at least one of the first and second mounting structures includes a plurality of angularly spaced holes (e.g., the adjustment bores 50b), the other of the first and second mounting structures includes at least one opposing hole (e.g., the hole on the adjustment flange 62b) selectively aligned with the plurality of angularly spaced holes in the plurality of fixed orientations, and the intermediate member includes pin element (e.g., the fastener 60) that is received in the opposing hole and one of the angularly spaced holes to fix the relative orientation of the actuation unit 34 relative to the fixed member in the plurality of fixed orientations.

Second Embodiment

Referring now to FIGS. 13-19, front and rear disc brake systems 212F and 212R in accordance with a second embodiment of the present invention will now be explained. The front and rear disc brake systems 212F and 212R of this second embodiment are identical to the front and rear disc brake systems 12F and 12R of the first embodiment, except the front and rear disc brake systems 212F and 212R include modified front and rear disc brake devices 214F and 214R. Accordingly, this second embodiment will not be discussed and/or illustrated in detail herein, except as related to the front and rear disc brake devices 214F and 214R. Rather, it will be apparent to those skilled in the bicycle art from this disclosure that the descriptions and illustrations of the first embodiment also apply to this second embodiment, except as explained and/or illustrated herein.

Parts of this second embodiment that are identical to parts of the first embodiment will be identified with same reference characters as the first embodiment for the sake of convenience. Parts of this second embodiment that are functionally identical (but not exactly identical) to parts of the first embodiment will be identified with the same reference characters but with "200" added thereto for the sake of convenience.

The front and rear disc brake devices 214F and 214R are identical, except for their orientations. Accordingly, only the rear disc brake device 214R will be explained and illustrated herein. However, it will be apparent to those skilled in the bicycle art from this disclosure that the descriptions and illustrations of the rear disc brake device 214R also apply to the front disc brake device 214L.

The rear disc brake device 214R is identical to the rear disc brake device 14R of the first embodiment, except the rear disc brake device 214R utilizes a modified adjustment structure (i.e., a modified actuation unit 234 and a modified main housing portion 236) in order to mount the actuation unit 234 to the main housing member 236 in a plurality of different fixed orientations. Specifically, in this embodiment, the actuation unit 234 can be attached to the main housing member 236 in ten (10) circumferentially equally spaced predetermined fixed positions that are spaced 36° apart from each other. FIGS. 16-19 illustrate fixed orientations that correspond to 0°, 36°, 72° and 108° fixed orientations of the actuation unit 234 relative to the main housing member 236, respectively. However, there are additional fixed orientations at 36° intervals.

In this embodiment, the actuation unit 234 includes a modified mounting member 254 having a modified tubular element 262 with external L-shaped circumferentially spaced splines 263. The main housing member 236 has a transverse bore 250a having mating splines 237 that retain the splines 263 via a bayonet type arrangement. Because the actuation arm 56 is biased clockwise relative to the mounting member 254, and because the rear brake cable 20R is slightly tensioned, the mounting member 254 is retained with the main housing member 236. In this embodiment, the splines 263 and 237 form first and second mounting structures of the actuation unit 234 and the main housing member 236. However, the adjustment structure does not require an intermediate member in this embodiment. Thus, the first and second mounting structures constitute parts of the adjustment structure in this embodiment.

GENERAL INTERPRETATION OF TERMS

In understanding the scope of the present invention, the term "comprising" and its derivatives, as used herein, are intended to be open ended terms that specify the presence of the stated features, elements, components and/or steps, but do not exclude the presence of other unstated features, elements, components and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the bicycle art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle disc brake device comprising:
a fixed member including a caliper housing;
an actuation unit coupled to the fixed member, the actuation unit being configured and arranged to move a friction member of the disc brake device from a release position to a braking position, the actuation unit including a stationary portion with an actuating line guide element; and
an adjustment structure operatively arranged to selectively orient the actuation unit relative to the fixed member in a plurality of fixed orientations such that the actuating line guide element changes from one of a plurality of set positions with a first orientation with respect to the fixed member to another one of the plurality of set positions with a second orientation that is different from the first orientation when the actuation unit is changed from a first position of the plurality of fixed orientations relative to the fixed member to a second position of the plurality of fixed orientations relative to the fixed member.

2. The bicycle disc brake device according to claim 1, wherein
the actuation unit includes a movable portion with an actuated element that is movable relative to the stationary portion from a rest position to a brake actuating position to move the friction member from the release position to the braking position.

3. The bicycle disc brake device according to claim 2, wherein
the stationary portion is non-movable relative to the fixed member when the actuation unit is coupled to the fixed member in one of the plurality of fixed orientations, and
the adjustment structure is arranged to selectively orient the stationary portion relative to the fixed member in the plurality of fixed orientations.

4. The bicycle disc brake device according to claim 2, wherein
the actuating line guide element has an outer casing receiving recess and an inner wire receiving bore in communication with the outer casing receiving recess, and the actuated element has an inner wire attachment point.

5. The bicycle disc brake device according to claim 4, wherein
the actuated element is pivotally coupled relative to the stationary portion and the fixed member to move about a pivot axis.

6. The bicycle disc brake device according to claim 5, wherein
the pivot axis is parallel to a direction of movement of the friction member from the release position to the braking position in the plurality of fixed orientations.

7. The bicycle disc brake device according to claim 5, wherein
the actuating line guide element and the inner wire attachment portion remain in constant angular orientations relative to each other in the plurality of fixed orientations when the actuated member is in a rest position.

8. The bicycle disc brake device according to claim 7, wherein
the plurality of fixed orientations are at predetermined fixed positions that are not infinitely adjustable.

9. The bicycle disc brake device according to claim 4, wherein
the actuating line guide element and the inner wire attachment portion remain in constant orientations relative to each other in the plurality of fixed orientations when the actuated member is in the rest position.

10. The bicycle disc brake device according to claim 9, wherein
the plurality of fixed orientations are at predetermined fixed positions that are not infinitely adjustable.

11. The bicycle disc brake device according to claim 1, wherein
the adjustment structure is operatively arranged between the fixed member and the actuation unit to selectively angularly orient the actuation unit relative to the fixed member in a plurality of fixed orientations about a fixed axis.

12. The bicycle disc brake device according to claim 1, wherein
the acting line guide element includes an outer casing receiving recess and an inner wire receiving bore in communication with the outer casing receiving recess.

13. The bicycle disc brake device according to claim 12, wherein
the actuating line guide element includes a support element with a barrel adjuster threadedly coupled to the support element with the barrel adjuster having the outer casing receiving recess.

14. A bicycle disc brake device comprising:
a fixed member including a caliper housing;

an actuation unit coupled to the fixed member, the actuation unit being configured and arranged to move a friction member of the disc brake device from a release position to a braking position; and an adjustment structure operatively arranged to selectively orient the actuation unit relative to the fixed member in a plurality of fixed orientations, the adjustment structure being operatively arranged between the fixed member and the actuation unit to selectively angularly orient the actuation unit relative to the fixed member in a plurality of fixed orientations about a fixed axis, the actuation unit including a first mounting structure, the fixed member including a second mounting structure, and the adjustment structure including an intermediate member engageable with the first and second mounting structures in the plurality of fixed orientations.

15. The bicycle disc brake device according to claim 14, wherein at least one of the first and second mounting structures includes a plurality of angularly spaced holes, the other of the first and second mounting structures includes at least one opposing hole selectively aligned with the plurality of angularly spaced holes in the plurality of fixed orientations, and the intermediate member includes pin element that is received in the opposing hole and one of the angularly spaced holes to fix the relative orientation of the actuation unit relative to the fixed member in the plurality of fixed orientations.

16. The bicycle disc brake device according to claim 15, wherein the pin element is a bolt that is threadedly attached in at least one of the holes of the first and second mounting structures.

* * * * *